Sept. 21, 1948.　　　　E. TANGUAY ET AL　　　　2,449,865
MACHINE FOR FORMING AND APPLYING
CLIPS TO WIRE MEMBERS
Filed Oct. 3, 1946　　　　　　　　　　6 Sheets-Sheet 5

INVENTOR
EDGAR TANGUAY
CARL KERTESZ
WALLACE KRAKAUER
BY Clark & Ott
ATTORNEY

Sept. 21, 1948.                E. TANGUAY ET AL                    2,449,865
                         MACHINE FOR FORMING AND APPLYING
Filed Oct. 3, 1946              CLIPS TO WIRE MEMBERS
                                                              6 Sheets-Sheet 6

INVENTOR
EDGAR TANGUAY
CARL KERTESZ
WALLACE KRAKAUER
BY Clark & Ott
ATTORNEY

Patented Sept. 21, 1948

2,449,865

UNITED STATES PATENT OFFICE 2,449,865

MACHINE FOR FORMING AND APPLYING CLIPS TO WIRE MEMBERS

Edgar Tanguay, Bloomfield, N. J., and Carl Kertesz, Jamaica, and Wallace Krakauer, Rockaway Park, N. Y., assignors to Samuel Krakauer, Rockaway Park, N. Y.

Application October 3, 1946, Serial No. 701,026

5 Claims. (Cl. 140—11)

This invention relates to machines for forming and applying clips to wire members for attaching the same together and the invention is particularly directed to an improved machine for cutting off from a strip of material clip forming lengths thereof and bending the same into surrounding relation with wire members supported upon the machine in contiguous relation and the invention is an improvement on Letters Patent No. 2,329,202 dated September 14, 1943.

The invention primarily comprehends a machine of said character for securing together coil wire springs and connecting wire members constituting the inner structure of spring mattresses, seat cushions and the like by forming and bending clips in encompassing relation with adjacent portions thereof arranged in contiguous side by side relation.

The invention has for a further object the provision of a machine adapted to form a single clip or a plurality of clips during each revolution of the driving mechanism and which functions to tightly compress the clips about the wire members so as to hold the same in abutting contiguous side by side relation and to prevent relative separation thereof.

The invention also has for an object cutting and forming die members which are successively moved into engagement with the clip forming length of material by direct engagement thereagainst of rotating cam members and which are tensioned for normal movement out of engagement with the clip forming length of material.

For a further object the invention resides in a device engaging the strip of material horizontally and in the plane of the movement thereof for feeding the strip in step by step motion for engagement by the cutting and forming die for severing the same into clip forming lengths and which device is adjustable for varying the length of the forward movement of the strip to thereby vary the lengths of the clip.

For a still further object the invention resides in a replaceable cutting and forming die for forming clips of different sizes.

With the foregoing and other objects in view, reference is now made to the following specification and accompanying drawings in which the preferred embodiment of the invention is illustrated.

Referring to the drawings by characters of reference, the machine includes a single unit indicated generally by the reference character A or a plurality of said units for simultaneously securing clips to the adjacent convolutions of coil wire springs and as illustrated the supporting frame B is of a size to accommodate several such units arranged in spaced parallel relation with the cutting and forming die members of the several units disposed in lateral alignment.

The supporting frame B is constructed of structural frame members and consists of angulated legs 10 at the corners thereof disposed with the sides thereof located outwardly and connected at the top by longitudinally extending front and rear angle bars 11 and 12 and at the opposite sides by angle bars 13 and 14 riveted or otherwise secured to the legs 10. Secured to the legs 10 at the lower ends thereof are angle clips 15 for rigidly securing the supporting structure to a foundation.

Figures 3, 4, 5, 6:
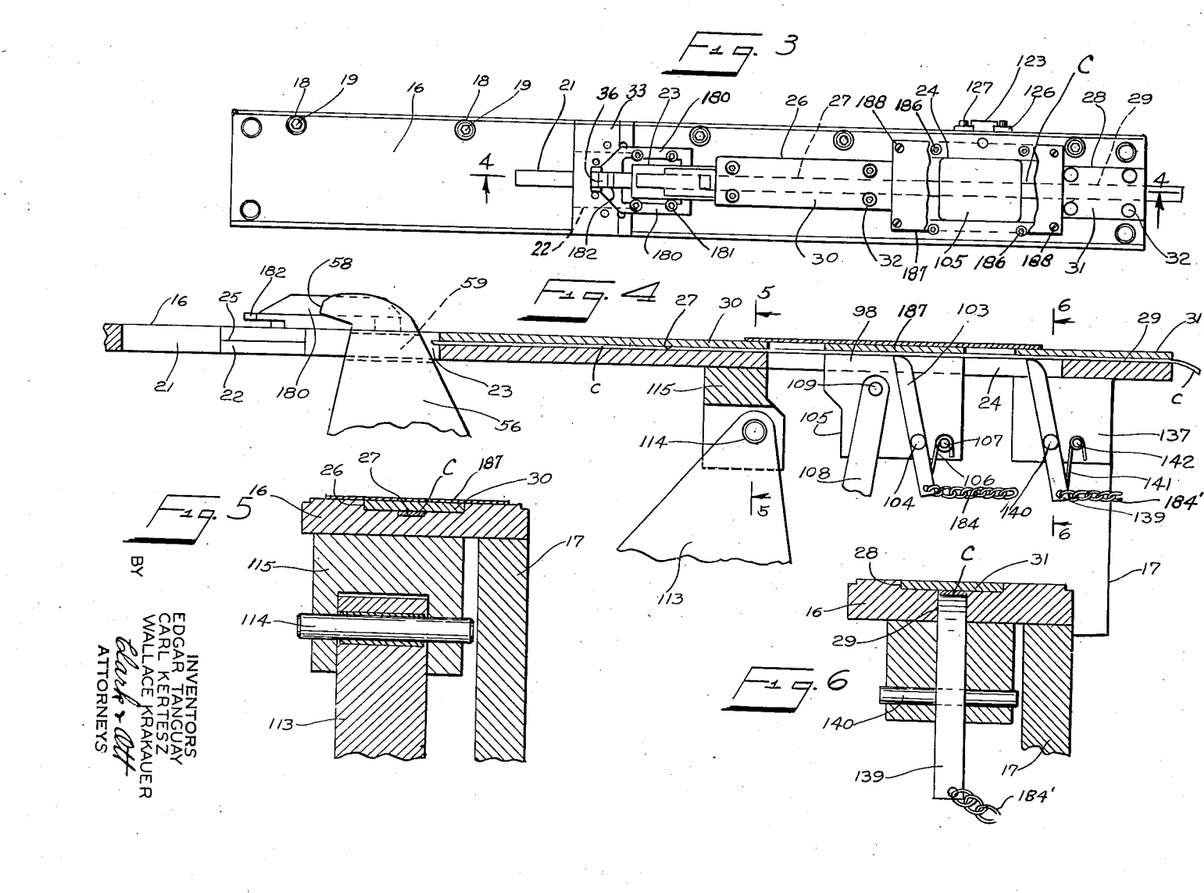
Fig. 3 is a top plan view of the bed of one of the units.
Fig. 4 is an enlarged fragmentary vertical sectional view taken approximately on line 4—4 of Fig. 3.
Fig. 5 is an enlarged fragmentary vertical sectional view taken approximately on line 5—5 of Fig. 4.
Fig. 6 is a similar view taken approximately on line 6—6 of Fig. 4.

The units A are identical in construction, each including an inverted L frame consisting of a longitudinally extending horizontally disposed bed plate 16 and a depending front plate 17 disposed flush with the forward longitudinal edge of the bed plate and secured thereto by bolts 18 located in counterbore openings 19 in the bed plate. The bed plate is supported at its opposite ends upon transversely extending bars 20 secured to the under side of the top flanges of the front and rear angle bars 11 and 12. The bed plate provides a work supporting surface and the same is formed with a series of slots 21, 22, 23 and 24 disposed in fore and aft alignment, the slots 21, 22 and 23 being in communication and together defining an opening of cruciform formation. At each side of the slot 22 the upper surface of the bed plate 16 is formed with a transversely extending groove 25 which opens through the opposite longitudinal edges thereof and intermediate the slots 23 and 24 the upper surface of the bed plate is formed with a longitudinally extending relatively wide groove 26 and medially of said groove a relatively narrow longitudinally extending groove 27 is formed therein which opens at its opposite ends into the slots 23 and 24. A relatively wide groove 28 is formed in the upper surface of the bed plate 16 between the slot 24 and the adjacent end of said bed plate and a relatively narrow groove 29 conforming to the width of the groove 27 extends longitudinally thereof and is formed in the sunken face thereof and opens into the slot 24 and through the end of the bed plate. Fitted in the grooves 26 and 28 are plates 30 and 31 respectively which are disposed in covering relation with the grooves 27 and 29 so as to form with the same tunnels or passageways for receiving an elongated strip of metal C from a source of supply which is fed through the said passageways and intermediate slot 24 for engagement by a cutting and forming die member located in the slot 22. The plates 30 and 31 are secured in the grooves 26 and 28 by means of studs 32 arranged with the heads thereof flush with the upper surface of the said plates and with the upper surface of the plates flush with the upper surface of the bed plate 16.

Figures 7, 8, 9, 10:
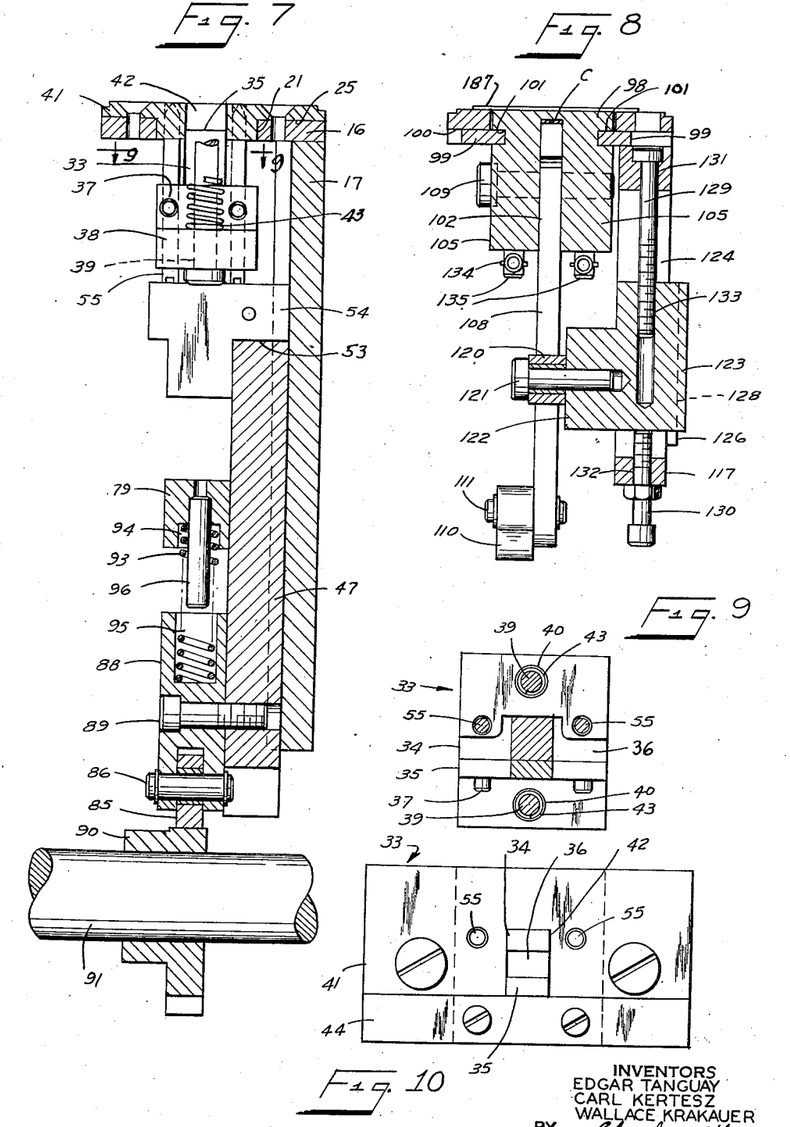
Fig. 7 is an enlarged vertical sectional view taken approximately on line 7—7 of Fig. 1.
Fig. 8 is a similar view taken approximately on line 8—8 of Fig. 1.
Fig. 9 is a horizontal sectional view taken approximately on line 9—9 of Fig. 7.
Fig. 10 is a top plan view of the cutting and forming die member shown in Fig. 7.
Figures 11, 12, 13, 14, 15, 16, 17:
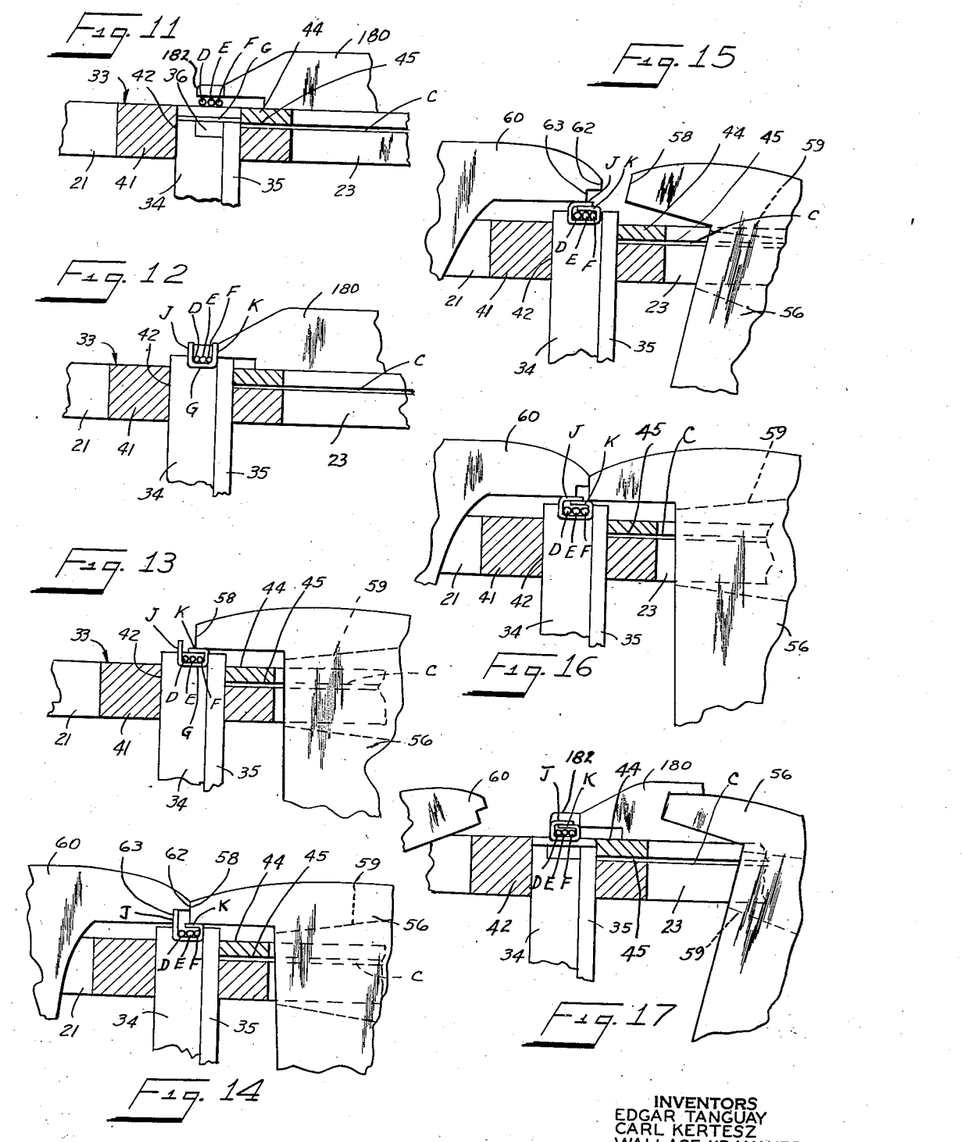
Fig. 11 to Fig. 17 inclusive are fragmentary vertical sectional views through a portion of the bed frame illustrating the successive cutting, forming and bending operations.

The strip C is cut into clip forming length by means of a cutting and forming die 33 consisting of a rabbeted die member 34 and a removable cutter member 35 which together define a notch 36 in the upper end thereof and are secured together in mating relation by means of studs 37. The die members 34 and 35 are secured in vertical relation to a horizontally disposed die head 38 which is vertically reciprocal on spaced studs 39 extending through openings 40 therein with the upper ends of the studs anchored in a horizontally disposed upper die head 41 to permit of vertical reciprocatory movement of the die members 34 and 35 in a rectangular slot 42 in the die head 41 so as to dispose the upper end of said die members in projecting relation above the upper die head 41 when at the upper limit of their reciprocatory movement. Coiled contractile springs 43 are located in surrounding relation on the studs 39 between the upper and lower die heads 38 and 41 for tensioning the lower die head for downward movement and normally retaining the same at the lower limit of its reciprocatory movement in engagement against the heads of the studs. The upper die head 41 is upwardly recessed in its lower surface at its opposite ends for fitting engagement of the recessed ends in the groove 25 in the bed plate 16 so as to support the rectangular depending portion thereof in the slot 21 and with the die members 34 and 35 located in alignment with the passageway defined by the grooves 27 and 29. The upper die head 41 is transversely recessed in its upper face at one side of the slot 42 in which is secured a cutter blade 44 having a cutting edge located adjacent the side edge of the cutter die 35. Beneath the cutter blade 44 the upper die head 41 is formed with a groove 45 arranged in alignment with the groove 27 and communicating with the slot 42 for receiving the metal strip C therethrough in underlying relation with the cutter bar 44.

The cutting and forming die members 34 and 35 are moved upwardly into intercepting relation with the strip C by means of a reciprocatory ram block 47 formed with aligned outwardly directed ribs 48 extending longitudinally of the opposite sides thereof and mounted for guided reciprocatory sliding movement between spaced gib blocks 49 and 50 secured in upright relation against the inner face of the front plate 17 of the L frame adjacent the opposite vertical edges of a vertical groove 51 formed in the inner face of the front plate with the ribs of the ram block 47 sliding in guide-ways 52 in the confronting faces of the gib blocks and the ram block disposed partly in the groove 51.

Secured in a notch 53 in the upper end of the ram block 47 is an angulated head 54 which extends laterally outward therefrom to underlie the lower die head 38 and to engage thereagainst for moving the same upwardly against the tension of the springs 43 for cutting off a length of the strip C by the engagement of the strip between the cutter member 35 and the cutter blade 44 and to effect the bending of the ends of the strip into clip formation about adjacent convolutions of coiled springs as will be hereinafter described. A pair of laterally spaced pilot pins 55 are mounted in upstanding relation in the head 54 which pins extend upwardly through aligned openings in the upper and lower die heads 41 and 38 with the free ends thereof projecting above the upper die head 41.

A rearwardly disposed clip bending die 56 is mounted for fore and aft swinging movement on a transverse stud 57 anchored in the gib block 50. The upper end of said clip bending die 56 extends through the slot 23 and is provided with an angulated forwardly directed terminal 58, and opening through the opposite front and rear sides of said clip bending die below the terminal 58 thereof is an opening or passageway 59 disposed in alignment with the groove or passageway 27 so as to freely receive the strip C therethrough as it is fed from the source of supply through the grooves or tunnels 27 and 29.

Figure 1:
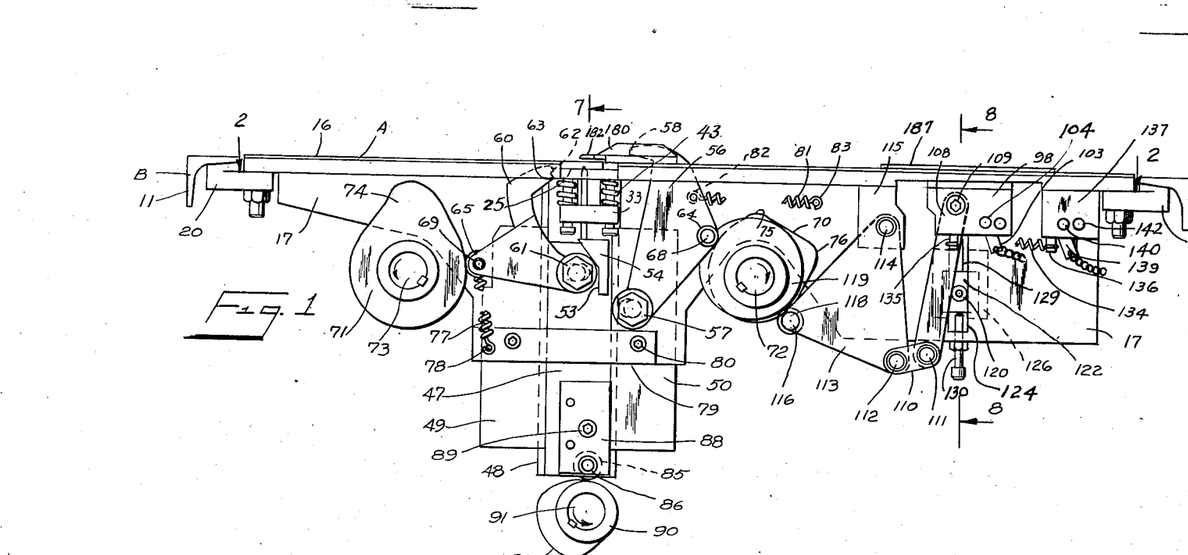
Fig. 1 is a longitudinal side view of one of the clip forming and bending units of the machine with the supporting frame omitted.
Figure 2:
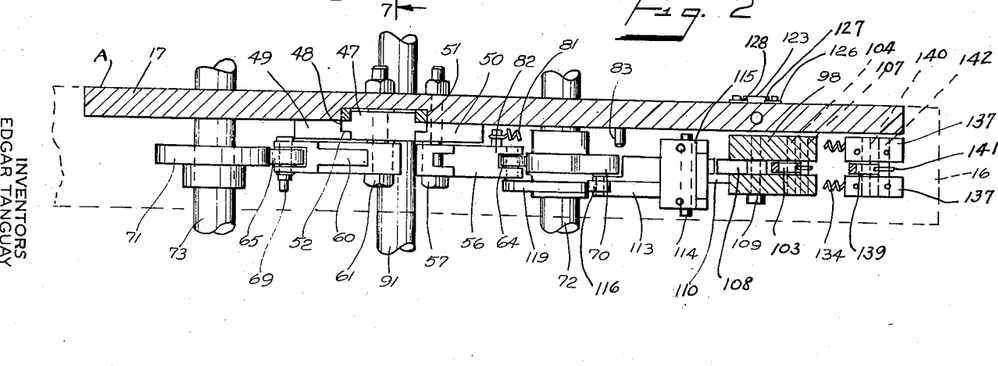
Fig. 2 is a longitudinal horizontal sectional view taken approximately on line 2—2 of Fig. 1 with parts omitted.

A forwardly disposed clip bending die 60 is pivotally mounted for fore and aft swinging movement on a transverse stud 61 anchored in the reciprocatory ram block 47 and arranged in fore and aft alignment with the rearwardly disposed clip bending die 56. The upper end of said forwardly disposed clip bending die 60 is adapted to be moved through the slot 21 with the upward swinging movement thereof and the free end thereof is formed with an angulated rearwardly directed terminal 62 and an angulated recess below said terminal forming a substantially radially disposed face 63. The clip bending dies 56 and 60 are provided with cam rollers 64 and 65 respectively which are journaled in the bifurcated oppositely disposed outer side portions thereof on fulcrum pins 68 and 69. The cam rollers 64 and 65 are engaged by cams 70 and 71 respectively splined to shafts 72 and 73, the cam 70 turning in a clockwise direction as viewed in Fig. 1 of the drawings while the cam 71 is rotated in a counter-clockwise direction and the cam 71 having a high point 74 for fore and aft swinging movement of the forwardly disposed clip bending die 60 and the cam 70 having adjacent high points 75 and 76 for successive fore and aft movements of the rearwardly disposed clip bending die 56 with each revolution of said cam. The cam roller 65 is tensioned against the cam 71 by means of a coiled spring 77 secured at its opposite ends to the pivot pin 69 and a pin 78 mounted in a cross bar 79 secured against the outer faces of the gib blocks 49 and 50 by bolts 80 in spanning relation with the ram block 47. The cam roller 64 is tensioned against the cam 70 by means of a coiled spring 81 secured at its opposite ends to a pin 82 mounted on the inner face of the member 56 and to a pin 83 secured to the inner face of the front plate 17.

The ram block 47 has a cam roller 85 pivoted on a pivot pin 86 in the bifurcated lower end of a mounting block 88 secured to the outer face of said ram block 47 by studs 89. Disposed in vertical alignment with the cam roller 85 is a cam 90 splined on a shaft 91 rotating in a counter-clockwise direction, the cam 90 having a high point 92 for moving the ram block 47 upwardly during each revolution of the cam. The cam roller 85 is tensioned against the cam 90 by means of a coiled expansion spring 93 secured in upright relation with its opposite ends located in confronting circular recesses 94 and 95 in the upper and lower edges of the bar 79 and mounting block 88 respectively and which spring is disposed in surrounding relation with a stud 96 depending from the bar 79 and protruding centrally through the circular recess 94.

The strip C is fed longitudinally through the passageways or grooves 27 and 29 by means of a reciprocatory hitch feed block 98 located in the slot 24 with the upper surface thereof disposed flush with the upper surface of the bed plate 16. The hitch feed block 98 is slidably mounted on side rails 99 located with their inner longitudinal edge portions disposed in grooves 101 in the opposite longitudinal side walls thereof and with their outer longitudinal edge portions secured to the recessed under side 100 of the bed plate 16. The feed block is formed with a longitudinally extending groove 102 which opens through the bottom face thereof and is disposed in longitudinal alignment with the passageways or grooves 26 and 28. The strip C extends through the groove 102 and is impinged against the top face thereof by means of a forwardly inclined finger 103 pivoted for fore and aft swinging movement on a pivot pin 104 in the bifurcated wall portions 105 formed by the groove 102. A spring 106 coiled about a cross pin 107 disposed in openings in the hitch feed block adjacent the pivot pin 104 is arranged with one end of the spring affixed to the feed block and the opposite end thereof tensioned against the lower end of the finger 103 for maintaining the beveled upper end of the finger in tensioned engagement against the strip C.

Fore and aft reciprocatory movement is imparted to the hitch feed block 98 by a rocker arm 108 pivoted thereto at its upper end on a stud 109 and pivoted at its lower end to a link 110 by a pivot pin 111. The opposite end of the link 110 is pivoted on a pivot pin 112 to a triangularly shaped rocker 113 which is pivotally mounted at its upper end for fore and aft swinging movement on a stud 114 to a hanger 115 secured to and depending from the under side of the bed plate 16. Oppositely disposed from the pivotal connection of the link 110 with the triangular rocker 113, the rocker is provided with a cam roller 116 which is pivoted in the bifurcated triangular forward portion thereof on a pivot pin 118 for engagement by an eccentric cam 119 secured to the cam 70 for movement therewith in a clockwise direction by the shaft 72. The rocker arm 108 is fulcrumed intermediate its length against a roller 120 rotatably mounted on the outer end of a stud 121 secured in a block 122 having a reduced extension 123 located in a vertical slot 124 in the front plate 17 in which the block is slidable for disposing the roller 120 at the desired location for producing the required length of stroke or reciprocation of the upper end of the rocker arm 108 with each rotation of the shaft 72.

The extension 123 of the block 122 protrudes through the forward face of the front plate 17 and is secured in position therein by vertical slide retainers 126 secured against the outer face of the front plate 17 by studs 127 and arranged with their inner edge portions slidably fitted in vertical grooves 128 in the opposite side faces of the extension 123. A pair of adjusting studs 129 and 130 extends into the vertical slot 124 of the front plate 17 through openings 131 and 132, the stud 129 being swivelly mounted in the opening 131 with the inner end thereof engaging in a threaded bore 133 in the extension 123 whereby the block may be raised or lowered in the slot 124 by swivelly turning the stud 29 in the proper direction. The stud 130 is threadedly engaged in the opening 132 and has its inner end tightened against the lower face of the extension 123 for securing the block 122 in adjusted position.

The rocker arm 108 is tensioned against the roller 120 by means of a pair of coiled contractile springs 134 secured at their forward ends to pins 135 carried by and depending from the under side of the bifurcated wall portions of the feed block 98 and at their rear ends to pins 136 carried by and depending from the under side of spaced blocks 137 secured to the under side of the bed plate 16 by studs 138. The springs 134 also function to move the feed block 98 rearwardly after each forward stroke produced by the forward rocking of the rocker arm 108 when the triangular shaped rocker 113 is swung rearwardly by the high part of the eccentric cam 119. An inclined finger 139 similar to the finger 103 is pivoted between the spaced block 137 on a pivot pin 140 with the upper beveled end of said finger tensioned against the under side of the strip C by means of a spring 141 coiled about a pin 142 disposed in openings in the blocks 137 and arranged with one end of the spring affixed thereto and the opposite end tensioned against the lower end of the finger 139. The forward inclination of the finger 139 permits longitudinal feeding movement of the strip C through the passageways or grooves 27 and 29 with each forward movement of the feed block 98 but prevents rearward movement of the strip C when the feed block 98 is moved rearwardly by the springs 134. The forwardly disposed finger 103 functions to impinge the strip C against the upper face of the groove 102 whereby the strip C is moved forward with each forward movement of the feed block 98 and when the feed block is moved rearwardly by the springs 134 the upper beveled end of the finger 103 slides rearwardly over the lower face of the strip C.

The cam shafts 72, 73 and 91 are journaled at their opposite ends in pillow blocks 144 affixed in upright relation to angle members 145, 146 and 147 secured to the supporting frame. The shafts 72 and 73 are journaled intermediate their length in pillow blocks 149 affixed in upright relation on a channel bar 150 which is secured at its opposite ends to vertical angle bars 151 affixed to the supporting frame. The cam shaft 91 is similarly mounted intermediate its length in a pillow block 152 secured to and depending from the channel bar 150. The cam shafts 72, 73 and 91 are driven by a driving shaft 154 through suitable spiral gears 155 splined on said cam shafts and engaging with spiral gears 156 splined on the driving shaft 154. The driving shaft 154 is journaled in pillow blocks 157 affixed in upright relation to channel bars 158 secured to the supporting frame B. The driving shaft 154 has a sprocket wheel 159 splined thereto which is engaged by a sprocket chain 160 operating over a similar sprocket wheel 161 mounted on the main shaft 162, the latter being journaled in pillow blocks 163 affixed in upright relation upon channel bars 164 secured at their ends to the angle bars 151 and to angle bars 165 affixed to the supporting frame.

The main shaft 162 is rotated by a belt 167 trained over a fly wheel 168 mounted on the shaft 162 and over a pulley 169 splined to the shaft of an electric motor 170 suitably affixed to the supporting frame. The fly wheel 168 is adapted to be operatively connected with the shaft 162 to turn the same by means of a standard clutch 171 which includes a standard non-repeat device 172. The non-repeat device 172 functions to automatically disconnect the fly wheel after each complete rotation of the cam shafts 72, 73 and 91. The clutch 171 includes a slide 173 which upon depressing the foot treadle cams a spline 175 longitudinally of the shaft 162 and between the same and the hub of the fly wheel 168 to thereby couple the fly wheel to the shaft. When the cam shafts 72, 73 and 91 have completed a revolution the eccentric of the non-repeat device moves the slide 173 so that the spline 175 is moved by its spring into released position, whereby the fly wheel rotates idly on the shaft 162.

A standard brake drum 177 is provided on the shaft 162 which frictionally engages the same so as to bring the shaft to rest when the non-repeat device 172 has disconnected the fly wheel 168 from the shaft 162. This produces a substantial instant stopping of the cam shafts 72, 73 and 74 after each revolution thereof and in order to prevent lag in the operation of the cam shafts a standard idler gear 178 is suitably supported by the supporting frame to dispose the same in tensioned engagement with the sprocket chain 160 so as to take up the slack therein.

In order to retain wire members such as coil wire springs D and F and a connecting wire member E in juxtaposition to each other upon the bed plate 16 and in position to be engaged by the clip G, a pair of gage members 180 are provided which are secured by studs 181 upon the bed plate 16 in parallel relation on opposite sides of the slot 23. The forward ends 182 of the gage members 180 are reduced in width and have their under surfaces rabbetted so as to provide a space between the same and the upper surface of the cutting and forming die 33. The wire members D, E and F are arranged upon the bed plate 16 directly under the forward ends 182 of the gage members 180 against which ends the wire members are impinged by the upward movement of the die members 34 and 35.

In order to release the spring fingers 103 and 109 so that the length of material C may be manually moved in the passageways 27 and 29, chains 184 and 184' are provided which are attached to the lower ends of the fingers respectively and are adapted to be tightened and linked at their outer end to a supporting structure for rocking the fingers on their pivotal connections to free the upper ends thereof from engagement with the strip C.

In operation the strip C is fed forwardly to project the end thereof into the slot 42 of the cutting and forming die 33 by the high portion of the eccentric cam 119 swinging the rocker 113 rearwardly to effect forward movement of the hitch feed block 98. Coincident with the forward movement of the strip C the high part of the cam 90 moves the ram block 47 upwardly which strikes the die head 38 of the cutting and forming die 33 and forces the die members 34 and 35 thereof upwardly to thereby sever the projecting end of the strip C to form the clip forming length G. The upward movement of the die members 34 and 35 moves the clip G upwardly against the wire members D, E and F which are forced against the under side of the forwardly projecting ends 182 of the gauge members 180. Continued upward movement of the die members 34 and 35 bends the opposite ends J and K of the clip upward tightly against the opposite sides of the wire members D and F by means of the notch 36 into which the medial portion of the strip C and the wire members D, E and F are forced with the upper ends of the clip extending upwardly above the upper end of the die members 34 and 35. The high part of the cam 90 maintains said die members 34 and 35 at the upper end of their stroke while the high part 76 of the cam 70 functions to move the clip bending die 56 forwardly to effect engagement of the forwardly directed terminal 58 thereof against the rear terminal K of the clip G and to bend the same forwardly and tightly against the upper surfaces of the wire members. The high point of the cam 71 then swings the forwardly disposed clip bending die 60 rearwardly so that the angulated rearwardly directed terminal 62 thereof strikes the forwardly directed terminal 58 of the rearwardly disposed clip bending die 56 to move the same from overlying impinging relation with the terminal K of the clip G. The radial face 63 of the clip forming die 60 then engages the upstanding terminal J of the clip G and the rearward swinging movement of said clip bending die bends the terminal J rearwardly upon and tightly against the forwardly bent terminal K. The rearwardly disposed clip bending die 56 is then swung forwardly by means of the high point 75 of the cam 70 so that the forwardly directed terminal 58 thereof strikes the rearwardly directed terminal 62 of the clip bending die 60 and moves the same from impinging relation upon the bent terminal J of the clip G. Coincident with this movement the high portions of the cams 70, 71 and 90 are moved out of engagement with their cam rollers whereby the springs 81, 77 and 93 function to swing the clip bending die 56 rearwardly, the clip bending die 60 forwardly and to move the ram block 47 downwardly whereupon the die members 34 and 35 are moved downwardly out of engagement with the clip by the springs 43 to thereby free the spring members D, E and F for removal from beneath the forward ends of the gauge members 180. During the forming and bending operation the high portion of the cam 119 has moved away from the cam roller 116 whereby the spring 134 moves the hitch feed block 98 rearwardly so that the finger 103 engages the strip C for repeating the forward movement thereof to thereby initiate the cycle of operation for cutting and forming another clip.

Figure 18:
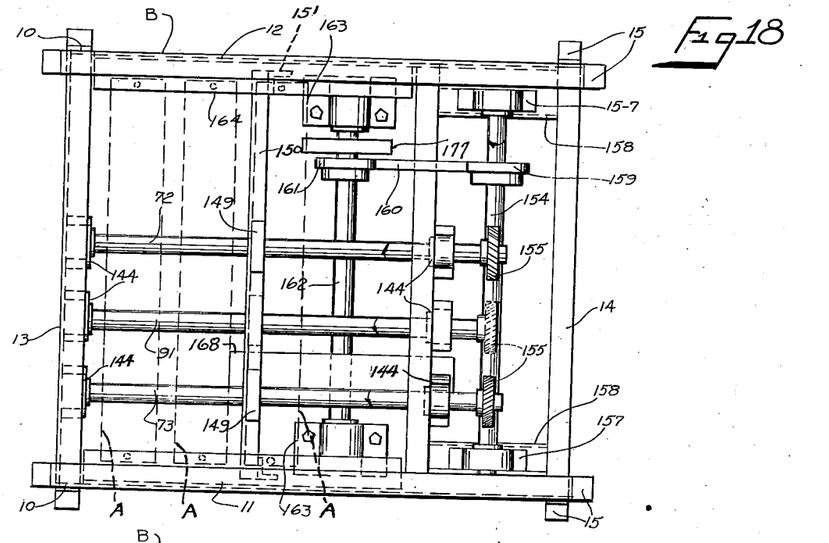
Fig. 18 is a top plan view of the supporting frame and driving mechanism with the cutting and forming units shown in outline.
Figure 19:
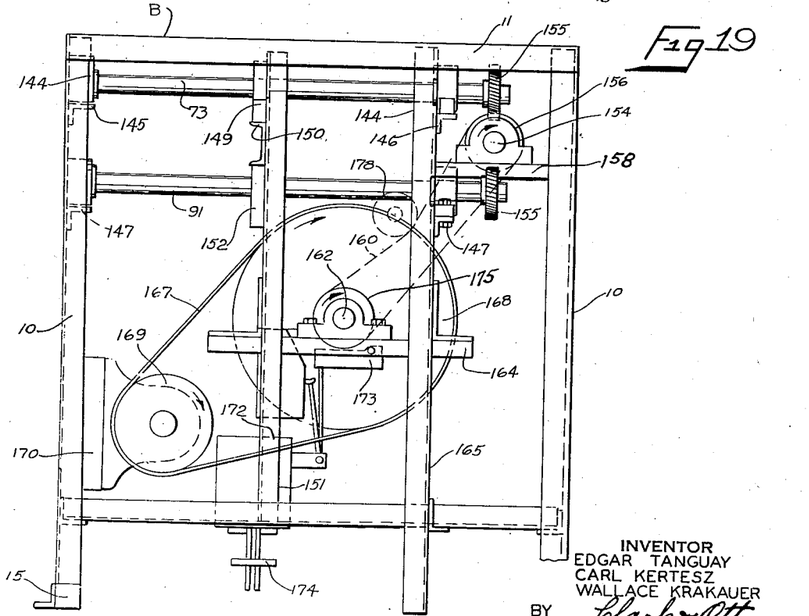
Fig. 19 is a front side view thereof.
Figure 20:
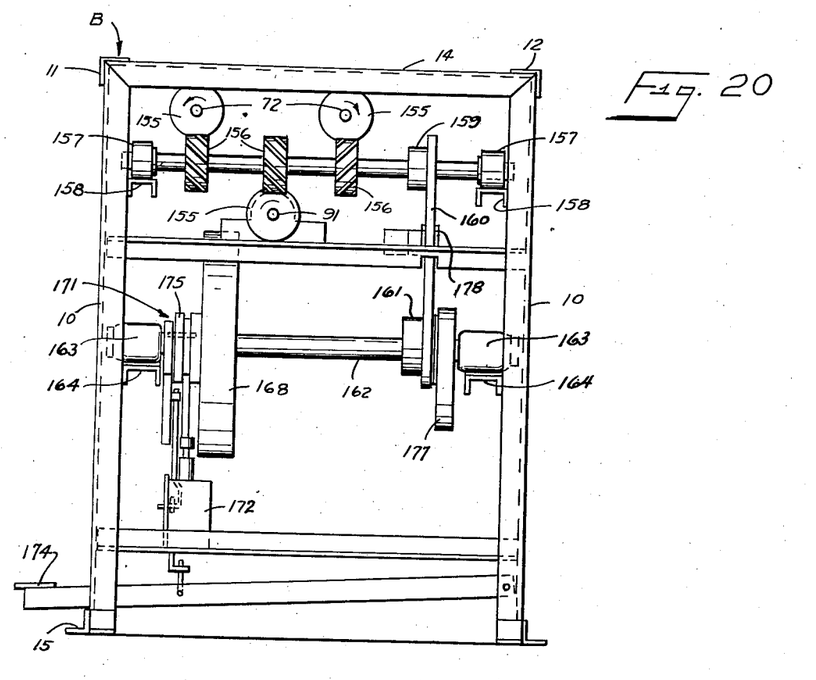
Fig. 20 is an end view thereof.

The aforesaid operation is performed simultaneously by each unit A to thereby simultaneously connect spaced groups of wire members together by clips G. As illustrated in Fig. 18 of the drawings three such units A are shown in broken line for simultaneously attaching clips G to three separate groups of wire members. It is to be understood, however, that any number of units A may be employed. In order to provide means for adjusting the height of the clip bending dies 56 and 60 so that the same engage against the upwardly bent ends K and J respectively of the clip G at the desired distance above the die members 34 and 35, the studs 57 and 61 are of the eccentric type which may be turned for raising or lowering the dies 56 and 60.

Figure 21:
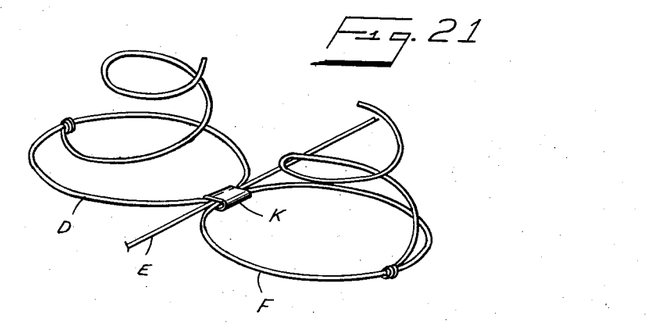
Fig. 21 is a perspective view of one of the finished clips in applied position securing a pair of coil wire springs and a spacing strip together.

The wire members united by the clips G may be of any desired type and as illustrated the same are in the form of coil wire springs D and F and a connecting wire member E. For such coil springs the pilot pins 55 moving upwardly with the die members 34 and 35 of the cutting and forming die 33 engage the springs and retain the same in position with the parts thereof to be united located above the die members 34 and 35.

The side rails 99 on which the hitch feed block 98 is slidable are secured in the recess 100 in the under side of the bed plate 16 by studs 186 having their headed upper ends located in counter bores in the upper surface of the bed plate. Overlying the hitch feed block 98 and closing the slot 24 is a cover plate 187 secured to the upper surface of the bed plate by studs 188.

What is claimed is:

1. In a machine for forming and applying clips to wire members to connect the same together, a support providing a surface upon which the wire members are positioned, said support having a passageway providing a guide for a strip of material, an abutment element secured to the upper face of said support to overlie the said wire members, a feed device guidedly mounted on said support for reciprocatory movement longitudinally of the pasageway and having resilient gripping means adapted to engage against said strip of material for feeding the same forwardly with the forward movement of said feed device, a cutting and forming die carried by said support for reciprocatory movement, a rocker arm pivoted to said feed device and fulcrumed intermediate its length for imparting forward movement to the feed block, a ram block mounted on said support for reciprocatory movement toward and away from said cutting and forming die for moving the same into intercepting relation with said strip for severing a clip forming end portion thereof projecting into overlying relation with said die and for impinging the wire members against said abutment and bending the ends of the severed end portion of the strip against the opposite sides of the wire members, a pair of bending dies pivotally mounted for swinging movement against the bent ends of the severed portion of the said strip for bending the same into overlying clamping relation with the wire members, means normally tensioning said die members respectively for retaining the same in retracted relation, revolving cams respectively engaging said ram block and said pivotally mounted dies for moving the same to effect the severing of the end portion of the strip and the bending thereof about the wire members, and a revolving cam moving in timed relation with the aforesaid cams for swinging the rocker arm to thereby move the feed device forwardly prior to the movement of said cutting and forming dies into engagement with the end portion of the strip.

2. In a machine for forming and applying clips to wire members to connect the same together, a support providing a surface upon which the wire members are positioned, said support having a passageway providing a guide for a strip of material, an abutment element secured to the upper face of said support to overlie the said wire members, a feed device guidedly mounted on said support for reciprocatory movement longitudinally of the passageway and having resilient gripping means adapted to be impinged against said strip of material for feeding the same forwardly with the forward movement of said feed device and to slide with reference to said strip of material on the rearward movement of said feed device, means normally tensioning said feed device for rearward movement, a rocker arm pivoted to said feed device and fulcrumed intermediate its length for imparting forward movement thereto, a cutting and forming die carried by said support for reciprocatory movement, a ram block mounted on said support for reciprocatory movement toward and away from said cutting and forming die for moving the same into intercepting relation with said strip for severing a clip forming end portion thereof projecting into overlying relation with said die and for impinging the wire members against said abutment and bending the ends of the severed end portion of the strip against the opposite sides of the wire members, a pair of bending dies pivotally mounted for swinging movement against the bent ends of the severed portion of said strip for bending the same into overlying clamping relation with the wire members, means normally tensioning said die members respectively for retaining the same in retracted relation, revolving cams respectively engaging said ram block and said pivotally mounted dies for moving the same to effect the severing of the end portion of the strip and the bending thereof about the wire members and a revolving cam moving in timed relation with the aforesaid cams for swinging the rocker arm to thereby move the feed device forwardly prior to the movement of said cutting and forming dies into engagement with the end of the strip.

3. In a machine for forming and applying clips to wire members to connect the same together, a support including a front plate and a bed plate upon which the wire members are positioned, said bed plate having a slot opening through the opposite faces thereof and a passageway providing a guide for a strip of material opening into said slot, an abutment element secured to the outer face of said bed plate to overlie said wire members, a feed device guidedly mounted on said bed plate for reciprocatory movement longitudinally of the passageway and having resilient gripping means adapted to engage against said strip of material for feeding the same forwardly with the forward movement of said feed device, a cutting and forming die mounted in said slot for reciprocatory movement, means normally tensioning said cutting and forming die for movement in one direction, a ram block mounted on said front plate for reciprocatory movement toward and away from said cutting and forming die for moving the same against the action of said tensioning means into intercepting relation with said strip for severing a clip forming end portion thereof projecting through said passageway into overlying relation with said die and for impinging the wire members against said abutment and bending the ends of the severed end portion of the strip against the opposite sides of the wire members, a pair of bending dies pivotally mounted for swinging movement against the bent ends of the severed portion of said strip for bending the same into overlying clamping relation with the wire members, means normally tensioning said die members respectively for retaining the same in retracted relation, and revolving cams respectively engaging said ram block and said pivotally mounted dies for moving the same to effect the severing of the end portion of the strip and the bending thereof about the wire members.

4. In a machine for forming and applying clips to wire members to connect the same together, a support providing a surface upon which the wire members are positioned, said support having a passageway providing a guide for a strip of material, an abutment element secured to the upper face of said support to overlie the said wire members, a feed device guidedly mounted on said support for reciprocatory movement longitudinally of the passageway and having resilient gripping means adapted to be impinged against said strip of material for feeding the same forwardly with the forward movement of said feed device and to slide with reference to said strip of material on the rearward movement of said feed device, means normally tensioning said feed device for rearward movement, a rocker arm pivoted to said feed device and fulcrumed intermediate its length for imparting forward movement thereto, a rocker pivoted to said support, a link pivoted at its ends to said rocker arm and said rocker, a cutting and forming die carried by said support for reciprocatory movement, a ram block mounted on said support for reciprocatory movement toward and away from said cutting and forming die for moving the same into intercepting relation with said strip for severing an end portion thereof projecting into overlying relation with said die and for impinging the wire members against said abutment and bending the ends of the severed end portion of the strip against the opposite sides of the wire members, a pair of bending dies pivotally mounted for swinging movement against the bent ends of the severed portion of said strip for bending the same into overlying clamping relation with the wire members, means normally tensioning said die members respectively for retaining the same in retracted relation, revolving cams respectively engaging said ram block and said pivotally mounted dies for moving the same to effect the severing of the end portion of the strip and the bending thereof about the wire members and a revolving cam moving in timed relation with the aforesaid cams and engaging said rocker for swinging the same and the rocker arm to thereby move the feed device forwardly prior to the movement of said cutting and forming dies into engagement with the end of the strip.

5. In a machine for forming and applying clips the groups of wire members to connect the groups together, a support providing a surface upon which the groups of wire members are positioned, said supports having passageways providing guides for strips of material, abutment elements secured in laterally spaced relation on the upper face of said support to overlie the groups of wire members respectively, a feed device for each strip of material guidedly mounted on said support for reciprocatory movement longitudinally of the passageways respectively and having resilient gripping means adapted to engage against said strips of material for feeding the same forwardly with the forward movements of said device, cutting and forming dies carried by said support in laterally spaced relation and in alignment with said passageways for reciprocatory movement for intercepting and severing sections from said strips of material, ram blocks mounted on said support for reciprocatory movement for moving the said dies for severing the ends of said strips and for impinging the groups of wire members against said abutments and for bending the severed ends of the strips against the opposite sides of the groups of wire members respectively, pairs of bending dies pivotally mounted for swinging movement against the severed ends of said strips for bending the same into overlying clamping relations with the groups of wire members and revolving cams engaging said ram blocks and said pivotally mounted dies for moving the same in unison to effect the severing of the end portion of the strips and the bending thereof about the groups of wire members.

EDGAR TANGUAY.
CARL KERTESZ.
WALLACE KRAKAUER.

REFERENCES CITED

The following references are of record in the file of this patent:

UNITED STATES PATENTS

| Number | Name | Date |
|---|---|---|
| 1,943,546 | Owen | Jan. 16, 1934 |
| 2,329,202 | Jonassen | Sept. 14, 1943 |
| 2,391,891 | Frankel | Jan. 1, 1946 |